United States Patent
Poliwoda et al.

(10) Patent No.: US 11,430,099 B2
(45) Date of Patent: Aug. 30, 2022

(54) METHOD FOR DETERMINING UNCERTAINTIES IN MEASUREMENT DATA OF AN OBJECT USING SUPERIMPOSED STATISTICAL NOISE

(71) Applicant: Volume Graphics GmbH, Heidelberg (DE)

(72) Inventors: Christoph Poliwoda, Mannheim (DE); Thomas Gunther, Heidelberg (DE); Christof Reinhart, Heidelberg (DE)

(*) Notice: Subject to any disclaimer, the term of this patent is extended or adjusted under 35 U.S.C. 154(b) by 141 days.

(21) Appl. No.: 16/627,982

(22) PCT Filed: May 8, 2018

(86) PCT No.: PCT/EP2018/061939
§ 371 (c)(1),
(2) Date: Dec. 31, 2019

(87) PCT Pub. No.: WO2019/007568
PCT Pub. Date: Jan. 10, 2019

(65) Prior Publication Data
US 2020/0160499 A1   May 21, 2020

(30) Foreign Application Priority Data
Jul. 3, 2017   (DE) ...................... 10 2017 114 811.6

(51) Int. Cl.
*G06T 7/64*   (2017.01)
*G01B 15/04*   (2006.01)
(Continued)

(52) U.S. Cl.
CPC ............ *G06T 7/0002* (2013.01); *G01B 15/04* (2013.01); *G06T 7/64* (2017.01); *G06T 11/005* (2013.01);
(Continued)

(58) Field of Classification Search
None
See application file for complete search history.

(56) References Cited

U.S. PATENT DOCUMENTS 6,307,964 B1 * 10/2001 Lin ..................... G06T 9/001
                                                    375/240.08
9,616,572 B2 * 4/2017 Watanabe ............... G06T 19/20
(Continued)

FOREIGN PATENT DOCUMENTS

DE   102007003060 A1   7/2008
EP       2966473 A1   1/2016
(Continued)

OTHER PUBLICATIONS

World Intellectual Property Organization, International Search Report for International Application No. PCT/EP2018-061939, dated Aug. 2, 2018, 20 total pages.
(Continued)

*Primary Examiner* — Tahmina N Ansari
(74) *Attorney, Agent, or Firm* — SoCal IP Law Group LLP; Angelo Gaz

(57) ABSTRACT

Described is a computer-implemented method for determining uncertainties in measurement data from a measurement of an object, wherein a digital representation of the object is generated by the measurement. The object representation has items of image information, which each indicate a value of a measurement variable for the object at a defined position of the object. Statistical noise is superimposed on the image information. The method includes determining the object representation, determining a distance field from the image information relating to the object representation, determining a strength of the statistical noise in the image information, determining an uncertainty of the distance values of the distance field on the basis of the strength of the statistical noise, and determining an uncertainty of the position of at (Continued)

Figure 1:
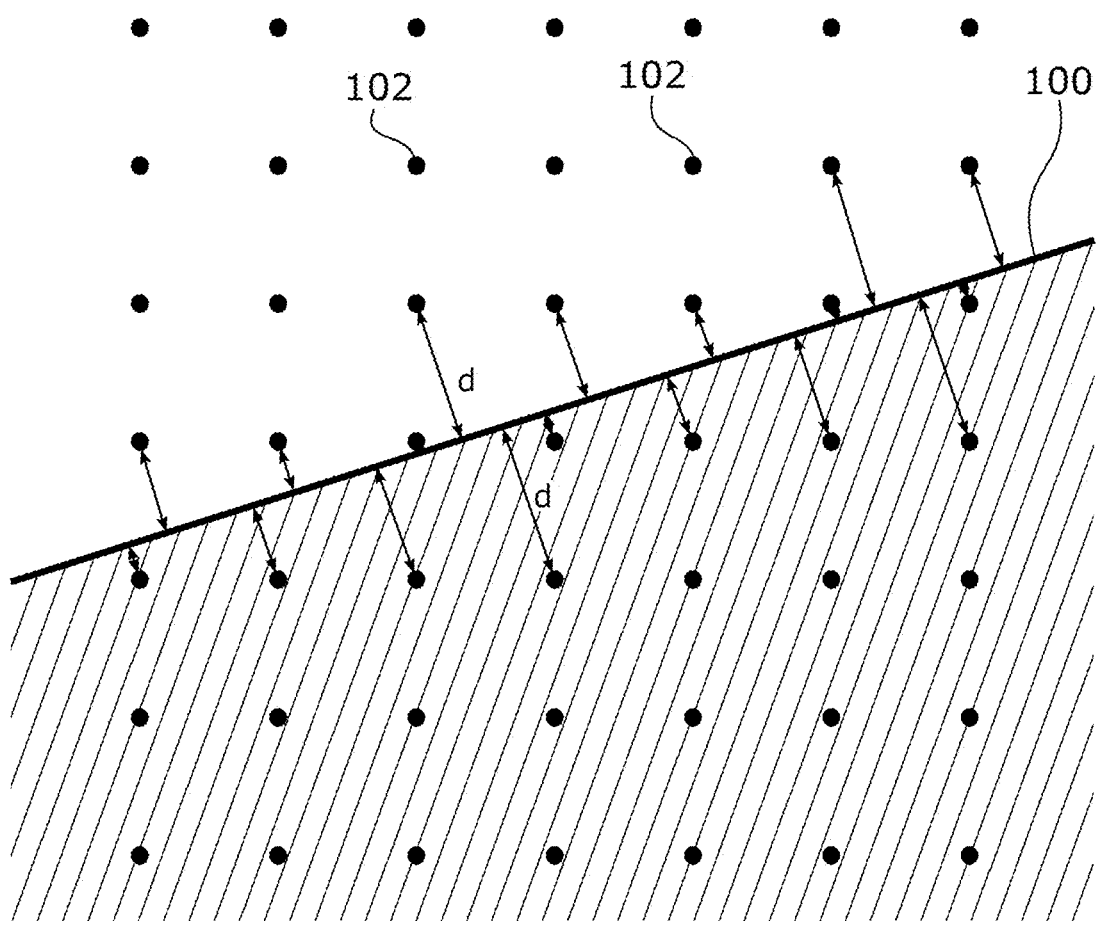

least one point on at least one material boundary surface from the uncertainty of the distance values of the distance field.

16 Claims, 7 Drawing Sheets

(51) Int. Cl.
  G06T 11/00 (2006.01)
  G06T 7/00 (2017.01)
(52) U.S. Cl.
  CPC .............. *G06T 2207/10088* (2013.01); *G06T 2207/10116* (2013.01); *G06T 2207/30168* (2013.01)

(56) References Cited

U.S. PATENT DOCUMENTS

| | | | | |
|---|---|---|---|---|
| 10,373,380 | B2* | 8/2019 | Kutliroff | G06T 19/006 |
| 10,675,763 | B2* | 6/2020 | Watanabe | B25J 9/1697 |
| 10,699,401 | B2* | 6/2020 | Flessner | G06T 7/0004 |
| 10,825,202 | B2* | 11/2020 | Poliwoda | G06T 9/00 |
| 11,047,810 | B2* | 6/2021 | Schonfeld | H05G 1/54 |
| 11,113,834 | B2* | 9/2021 | Poliwoda | G06T 7/0006 |
| 2015/0003678 | A1* | 1/2015 | Watanabe | B25J 9/1697 382/103 |
| 2015/0006126 | A1* | 1/2015 | Taguchi | G06K 9/6211 703/2 |
| 2017/0243352 | A1* | 8/2017 | Kutliroff | G06T 19/006 |
| 2019/0184198 | A1* | 6/2019 | Mori | A61N 5/1049 |
| 2019/0310348 | A1* | 10/2019 | Yamao | G06K 9/6215 |
| 2020/0118300 | A1* | 4/2020 | Poliwoda | G06T 7/0006 |
| 2020/0160499 | A1* | 5/2020 | Poliwoda | G01B 15/04 |
| 2021/0118164 | A1* | 4/2021 | Poliwoda | G01B 15/045 |

FOREIGN PATENT DOCUMENTS

| | | |
|---|---|---|
| EP | 3109826 A2 | 12/2016 |
| WO | 2019007568 A1 | 1/2019 |

OTHER PUBLICATIONS

Jones et al., "3D Distance Fields: A Survey of Techniques and Applications", journal, IEEE Transactions on Visualization and Computer Graphics, vol. 12, No. 4, published Jul. 2006, pp. 581-599.

* cited by examiner

METHOD FOR DETERMINING UNCERTAINTIES IN MEASUREMENT DATA OF AN OBJECT USING SUPERIMPOSED STATISTICAL NOISE

RELATED APPLICATION INFORMATION

This patent claims priority from International PCT Patent Application No. PCT/EP2018/061939, filed May 8, 2018 entitled, "METHOD FOR DETERMINING UNCERTAINTIES IN MEASUREMENT DATA FROM THE MEASUREMENT OF AN OBJECT", which claims priority to German Patent Application No. 10 2017 114 811.6, filed Jul. 3, 2017 entitled, "METHOD FOR DETERMINING UNCERTAINTIES IN MEASUREMENT DATA FROM THE MEASUREMENT OF AN OBJECT", all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The invention relates to a computer-implemented method for determining uncertainties in measurement data from a measurement of an object.

A multiplicity of methods for measuring and subsequently imaging objects, for example workpieces, are known in the prior art. In the industrial environment in particular, these measurement methods have become established in the meantime as a selection resource for workpiece testing. Both methods which image only the surface of an object and methods which make it possible to completely represent the internal structure of an object are found in this case. For testing workpieces, a surface or surface geometry of a workpiece is usually checked with regard to its dimensions and is compared with a reference value. It is therefore possible to test, for example in a random manner, whether a production process for a workpiece is able to comply with the desired specifications for a workpiece.

In addition to the dimensions of the workpiece, an important criterion for testing workpieces is an uncertainty of the dimensions derived from measurement data of a measurement. In this case, depending on the imaging method used, a multiplicity of error sources can result in an uncertainty in the dimensions of an image of an object. Whereas systematic imaging errors can be determined, for example, by using a material measure, few methods which can also take into account statistical imaging errors to a sufficient extent and can quantify them, in particular, are known in the prior art.

Against this background, the present invention is based on the objective technical object of providing an improved method for determining uncertainties in measurement data from a measurement of an object which overcomes the above-mentioned disadvantages of the prior art.

Main features of the invention are stated in this document.

In a first aspect, the invention relates to a computer-implemented method for determining uncertainties in measurement data from a measurement of an object, wherein a digital representation of the object is generated by the measurement. The object representation has a multiplicity of items of image information relating to the object, wherein an item of image information indicates a value of a measurement variable for the object at a defined position of the object. Statistical noise is superimposed on the image information, wherein the method has the following steps.

In a first method step, the measurement data are first of all determined. A distance field is then determined from the image information relating to the object representation, wherein the distance field has a multiplicity of distance values. In this case, a distance value indicates, for a particular point in the distance field, the shortest distance between the point and a closest material boundary surface of the object. A strength of the statistical noise in the image information relating to the measurement points of the measurement data is then determined and an uncertainty of the distance values of the distance field is determined on the basis of the strength of the statistical noise. An uncertainty of the position of at least one point on at least one material boundary surface is then determined from the uncertainty of the distance values of the distance field.

In order to determine the uncertainty of the position of a point on at least one material boundary surface, the position of a point of a material boundary surface can first of all be determined, for example, from a subset of distance values of the distance field. The mean uncertainty of all of those distance values which were taken into account when determining the position of the point of the material boundary surface is then assumed as the uncertainty of the determined position of the point. In addition to forming a simple mean value, weighting of the uncertainties of the distance values which were taken into account when determining the position of the point of the material boundary surface can also be provided. In this case, a lower weight can be assigned to the uncertainties of comparatively high distance values, for example, than to the uncertainties of comparatively low distance values.

The invention is based on the knowledge that a significant part of the uncertainty of imaging of an object by means of an imaging method is caused by statistical noise to which the recorded measurement data are subject. In this case, statistical noise may arise as a result of a multiplicity of factors. For example, noise may already be inherent in a measurement method used to determine the measurement data. For example, an electronic detector used to determine the measurement data may have a defined noise behavior. Furthermore, further noise may also be introduced as a result of the processing of measurement data or raw data on which the measurement data are based. In this case, statistical noise is understood as meaning noise whose effect on the noisy measurement data follows a statistical, that is to say substantially random, distribution, for example a normal distribution. The type of statistical distribution on which the noise is based can be locally different here over the image of the object, in which case, in addition to symmetrical distributions which include the above-mentioned normal distribution, the noise may also be based on asymmetrical distributions.

In this case, the statistical noise is usually characterized by a defined strength with which it influences the image information relating to the object representations. If the strength of the statistical noise is known, it is possible to estimate how great the uncertainty of an item of distance information relating to the distance field is, which distance information is derived from the noisy image information. If the uncertainties of the distance values of a distance field are known, it is again possible to directly derive an uncertainty of a position of a material boundary surface, which is derived from the distance field, and, in particular, the position of individual points on the material boundary surface of a represented object therefrom. Consequently, when determining material boundary surfaces of an object from the image information relating to a measured object representation, the method according to the invention allows errors to be estimated for positions of material boundary surfaces of the object or of points on such material boundary surfaces which are derived from the object representation. It is therefore possible to assess geometrical properties of an imaged object with an error by means of the method according to the invention.

In this case, the distance field can code the position of a material boundary surface in substantially two ways. In a first approach, a distance value of the distance field represents only the absolute value of the distance between a corresponding point in the distance field and the closest material boundary surface. However, in this case, as a result of the pure distance information at a point in the distance field, the side of a material boundary surface on which the point is arranged is not yet clear. However, this information can be additionally coded in the distance field by virtue of the distance values additionally being provided with a sign. In this case, a positive sign is assigned to distance values of data points on a first side of the material boundary surface, whereas a distance value having a negative sign is assigned to data points on the second side of the material boundary surface. The sign of a distance value of a data point can then be used to derive, for example, whether a data point is inside a geometry or a body or outside. This additional information can be used to determine dimensions of the imaged object.

In this case, such a distance field with signed distance values is known as a "signed distance field" (SDF). According to one embodiment, an unsigned distance field can be converted in this case into a signed distance field by adapting the distance values in such a manner that, although their absolute value remains unchanged, the gradient of the entire distance field is equal to 1 at each point.

A measurement from which the image information is obtained should be understood in this case as meaning any desired form of imaging of the object or properties of the object. For example, the measurement can be carried out within the scope of a magnetic resonance tomographic examination. The image information obtained in this process quantifies properties of the object, for example material composition, position of surfaces or similar parameters, which can be derived from measurement variables, for example a spin relaxation time or the like. In order to determine the measurement data, both the performance of a measurement and the reading of a storage medium can be provided in this case. For example, it is possible to resort to measurements which have already been carried out and archived data which are intended to be subsequently assessed with respect to an uncertainty of the image.

The above-described strength of the statistical noise in the image information is a measure which describes how greatly the image information is influenced by the statistical noise. The effect of the noise superimposed on the measurement data or image information is substantially the fact that the determined numerical value for a measurement variable differs by a particular amount from the numerical value actually determined without noise. In this case, a numerical value may be both too small and too large on account of the noise. There are different approaches for determining the strength of the noise which will be discussed in yet more detail below. In this case, the strength of the statistical noise, like an item of image information as well, can be represented as a numerical value which describes how greatly the image information differs from the actually expected value on account of the noise.

In order to determine an uncertainty of a distance value from the strength of the statistical noise, the following procedure can be used according to one embodiment: an error in the image information relating to a defined point of the object is first of all determined from the strength of the statistical noise. A computing rule which is used to determine distance values from the image information relating to the object representation is then determined. The uncertainty of the distance value is then determined from the effect of the error on the result of the computing rule. In order to determine the error in an item of image information, the numerical value of the determined strength of the statistical noise, for example, can be assumed as an error interval for the numerical value of an item of image information.

Alternatively, the numerical value of the determined strength of the statistical noise can also be converted, with the result that the error in the image information can be quantified by the value obtained in this manner. This may be necessary, for example, if the strength of the statistical noise is derived from an item of information which initially differs from the actual image information, but can be converted into the latter. In this case, an error interval for the numerical value of an item of image information need not necessarily be arranged symmetrically around the numerical value. Rather, an error interval may also be distributed asymmetrically around the numerical value of an item of image information, in particular if the statistical noise is based on an asymmetrical statistical distribution. For example, it is possible for an error interval which extends from 147 to 156 to be assigned to an item of image information having a numerical value of 150 from the estimation of the statistical noise. Both a symmetrical and an asymmetrical error interval can likewise also be determined for stating the uncertainty of a distance value or of a position of a point on a material boundary surface.

The computing rule for determining the distance values may assume various forms in this case. However, it will in any case include, as an input value, the image information relating to the object representation, which information is converted into a distance value on the basis of a mathematical formula. The effect of an error in the input values on the result of the calculation can be determined from the knowledge of such a formula, for example by means of the Gaussian error propagation.

For example, according to one embodiment, the uncertainty of a distance value can be determined from the quotient of the strength of the statistical noise in the image information on which distance value is based and the gradient of the image information in the region of that point in the distance field which is assigned to the distance value.

It has already been stated above that the strength of the statistical noise in the image information relating to the measurement data is determined as part of the method according to the invention. In this case, the strength of the noise can be determined globally for the entire measurement image or the entire object representation, for example. This is useful, for example, when the statistical noise which is superimposed on the measurement data is reflected to the same extent over the entire imaged region.

In most cases, however, the effect of the statistical noise in the image information is different in different regions of an object representation. This is due to different characteristics of the imaging apparatus for different regions of the image and to a relationship of the effect of the noise of the image information itself, which relationship can often be observed. For this reason, another embodiment provides for the method to comprise the subdivision of the measurement points into spatial regions of the object, wherein the strength of the statistical noise is respectively determined separately for the different spatial regions of the measurement data. In this case, the regions are preferably selected in such manner that the effect of the statistical noise on the image information is constant to the greatest possible extent within a region. In this case, a single value for the strength of the statistical noise can be assigned to a complete region.

In order to determine the strength of the statistical noise for a region, one embodiment can then provide for this strength to be determined from the image information relating to a subset of the measurement points of the region. This makes it possible to reduce the computing complexity for determining the noise information without the fear of a significant loss of information. On account of the homogeneity of the effect of the noise within a region owing to the corresponding choice of the region, no relevant gain in information relating to the strength of the noise can be expected any more after a particular number of input values for determining the strength of the noise by a further addition of further points or measurement data relating to the points. However, the accuracy with which the strength of the noise is estimated from the variance is improved with an increasing number of values taken into account in the process. The desired accuracy with which the variance is estimated in comparison with the computing load produced as a result can therefore be effectively estimated, and the number of processed measured values can accordingly be adapted.

The strength of the statistical noise in the image information for one of the regions can be determined as follows according to one embodiment:

An average value of the image information relating to the region is first of all determined. The mean deviation of the image information relating to the region from this average value is then determined and the mean deviation is defined as the strength of the statistical noise in the image information. This approach can be used, in particular, in regions with a homogeneous distribution of the effect of the statistical noise and a homogeneous distribution of the image information. A homogeneous distribution of the image information is present, for example, if only a single, defined material of an imaged object is represented by means of corresponding image information over a particular image section.

The information determined in this manner relating to the strength of the statistical noise can also be extrapolated, for example, to regions with an inhomogeneous distribution of the image information. For this purpose, provision may be made, for example, for different regions to be defined in which the above-mentioned determination of the strength of the statistical noise is possible on account of the homogeneity of the image information and/or the effect of the statistical noise. Regions which extend between such homogeneous regions can then be assessed with regard to the effect of the statistical noise by means of an interpolation method.

In an alternative approach, the strength of the statistical noise may be the standard deviation of the statistical noise according to one embodiment. The use of the standard deviation of the statistical noise as a measure of the strength of the noise has the advantage here that the standard deviation indicates a generally easily determinable measure of uncertainty of a variable which is subject to a statistical fluctuation, as is the case in statistical noise.

In regions with an inhomogeneous distribution of the grayscale values, for example in the region of material boundary surfaces, the strength of the statistical noise can be determined, for example, by first of all creating a theoretical model for the progression of the grayscale values in the corresponding region. For this purpose, a theoretical model of the grayscale values can be fitted to the actual grayscale values by means of a fit method, for example. The deviations of the individual grayscale values from the progression of the grayscale values which is provided by the fitted model can then be interpreted as being caused by the statistical noise and can be used as a basis for determining the strength of the statistical noise.

In this case, one embodiment provides for the standard deviation of the statistical noise for a point in the object representation to be determined from the image information within a defined environment around the point. For example, in a two-dimensional representation of an object, a circle of a particular radius can be drawn around a point in the object representation, wherein all image information within this circle is used to determine the standard deviation. The computing complexity for determining the standard deviation can thus be reduced, while the determination of the standard deviation can be simultaneously restricted to a region within which the effect of the statistical noise is constant to the greatest possible extent. In this case, the size of the defined environment can be dimensioned, in terms of its extent, in such a manner that there are sufficient statistics from which a reliable item of information relating to the strength of the statistical noise can be derived. When selecting the size of the environment, the resulting computing complexity for determining the strength of the noise can be taken into account at the same time, with the result that the scope of the statistics can be weighed up against the resulting computing complexity.

In addition to the above-described determination of uncertainties with regard to the position of material boundary surfaces of an object or of individual points on such material boundary surfaces, one embodiment provides for the information relating to the uncertainty of distance values to be used to estimate an error for further properties of the represented object. For this purpose, provision is made for the method to also comprise the determination of at least one dimension of the object from the distance values of the distance field and the determination of an uncertainty of the dimension on the basis of the uncertainty of the distance values. In this case, a dimension can be understood as meaning, for example, the diameter of a drilled hole or the length of an edge. Dimensions of the represented object can be directly determined here, for example, from the positions of material boundary surfaces coded by the distance values of the distance field.

In this case, a dimension and the uncertainty of a dimension can be determined both directly from the distance values and the corresponding uncertainties themselves and from the determined positions of the material boundary surfaces and the determined uncertainty of the positions of points on the material boundary surfaces.

In addition to the above-described determination of dimensions of a represented object directly from the material boundary surfaces coded by the distance field, the actually expected geometrical shape of an object can also be taken into account when determining dimensions according to another embodiment. For this purpose, one embodiment provides for the determination of a dimension of the object from the distance values of the distance field to comprise determining and fitting a target geometry of the object into the distance field by using a fit method. The dimension of the object is then determined according to the embodiment on the basis of the target geometry which has been fitted in in this manner.

This makes it possible to directly compare an envisaged target geometry of the represented object and the true actual geometry, wherein corresponding dimensions of the target geometry can be directly compared with the corresponding dimensions of the object determined from the actual geometry taking into account the corresponding uncertainties of the dimensions. For example, it is possible to check whether predefined manufacturing tolerances have been complied with in the case of an examined object or whether an examined object can be used for further assembly steps on account of the determined dimensions taking into account the uncertainties.

In this case, a fit method which is used to fit the determined target geometry of the object into the distance field can be understood as meaning any mathematical method which is suitable for fitting a specific geometry into digital data in such a manner that the geometry has the best possible congruence with the digital data from the representation of the object. In this case, the uncertainty of the distance values can be taken into account when determining the error propagation when using a fit method.

According to one embodiment of the invention, for example for fitting in the determined target geometry, it is possible to use the least squares method which is also known as a Gaussian fit in the prior art. In this case, a target geometry is fitted into the material boundary surfaces represented by the measurement data in such a manner that the mean square distance of the target geometry from the material boundary surfaces from the digital representation is as short as possible. This method can generally be carried out with little computing complexity and is particularly suitable when there are no boundary conditions in terms of the position of the target geometry relative to the material boundary surfaces represented by the measurement points in the digital representation.

In some cases, however, the situation may occur in which a determined target geometry is intended to be fitted into the digital representation of the object with a number of boundary conditions. In this respect, embodiments provide for the determined target geometry to be fitted into the distance field as an inscribed or circumscribing figure. In this case, an inscribed figure should be understood as meaning a figure which lies completely within the material boundary surfaces of the object which are coded by the distance field. Conversely, a circumscribing figure is a figure which lies completely outside the material boundary surface coded by the distance field. For example, the use of an inscribed figure is useful, in particular, when the internal diameter of a drilled hole is intended to be determined by fitting in a corresponding target geometry, namely a cylinder. In this case, it is usually only relevant for practical applications whether the drilled hole has a certain minimum diameter. Fitting in the target geometry as an inscribed figure ensures in this case that the dimensions of the target geometry which has been fitted in represent the minimum diameter of a drilled hole.

In the opposite case in which a pin projecting from an object, for example, is intended to be represented by a target geometry, it is advantageous if the target geometry, again a cylinder, is fitted into the distance field as a circumscribing figure. This is because the maximum diameter of the projecting pin is represented in this case by the geometry which has been fitted in. In this case, it is entirely possible to have to respectively separately decide, in different regions of the imaged object, whether a target geometry to be fitted in is intended to be fitted into the distance field as an inscribed or circumscribing figure.

According to another embodiment, it is also possible to use a minimum zone fit to fit in the determined target geometry. The individual selection of which fit method is used depends on the respective application situation, as described above.

According to one embodiment, the distance field used during the method according to the invention can be determined in this case by first of all determining the position of material boundary surfaces from the image information relating to the object representation. A closest material boundary surface to a data point and the respective distance between the data points and the respective closest material boundary surface are then respectively determined for the data points of the data field. The respectively determined distance is then assigned to the respective data points as a distance value. Edge detection methods which are generally known in the prior art can be used to determine the position of material boundary surfaces from the image information relating to the object representation. Examples of such methods are the Canny algorithm or the ISO50 algorithm.

According to one embodiment, the object representation is a rastered representation of the object, wherein the rastered representation has a multiplicity of measurement points of a measurement of the object which are arranged in a raster, wherein a measurement point has at least one item of image information.

Another embodiment also provides for the measurement to be a computer tomographic measurement, wherein the image information relating to a measurement point describes the local x-ray absorption of the object at the location of the measurement point. Computer tomography has the advantage here that inner regions of an object can also be determined and imaged, with the result that a non-destructive integrated representation of an object is possible.

Particularly when using a computer tomographic measurement to generate the object representation, the statistical distribution on which the noise in the image information is based can differ from a symmetrical distribution, which can also include the above-mentioned normal distribution, and can vary locally over the object representation. This circumstance is due to the fact that, in the case of a computer tomographic measurement, projection data are first of all measured and have to be converted into an image of the object by means of corresponding reconstruction mathematics. However, the mathematics used here are generally non-linear. A direct consequence of this is that the actually substantially symmetrical Gaussian noise behavior of a detector of a computer tomograph, does not necessarily result in a symmetrical noise behavior of the image information relating to the object representation. Rather, the statistical distributions on which the noise in the image information is based can also become asymmetrical and/or locally vary greatly in the object representation. It can often be observed, for example, that bright regions of a computer tomographic image, which indicate strong x-ray absorption by the examined object, have stronger noise than dark regions of the image.

For this reason, it may be useful to derive the noise behavior or the strength of the statistical noise in the image information from the projection data on which the object representation is based, rather than from the image information relating to the object representation.

In another aspect, the invention relates to a computer program product having instructions which can be executed on a computer and, when executed on a computer, cause the computer to carry out the method as described above.

Figure 2:
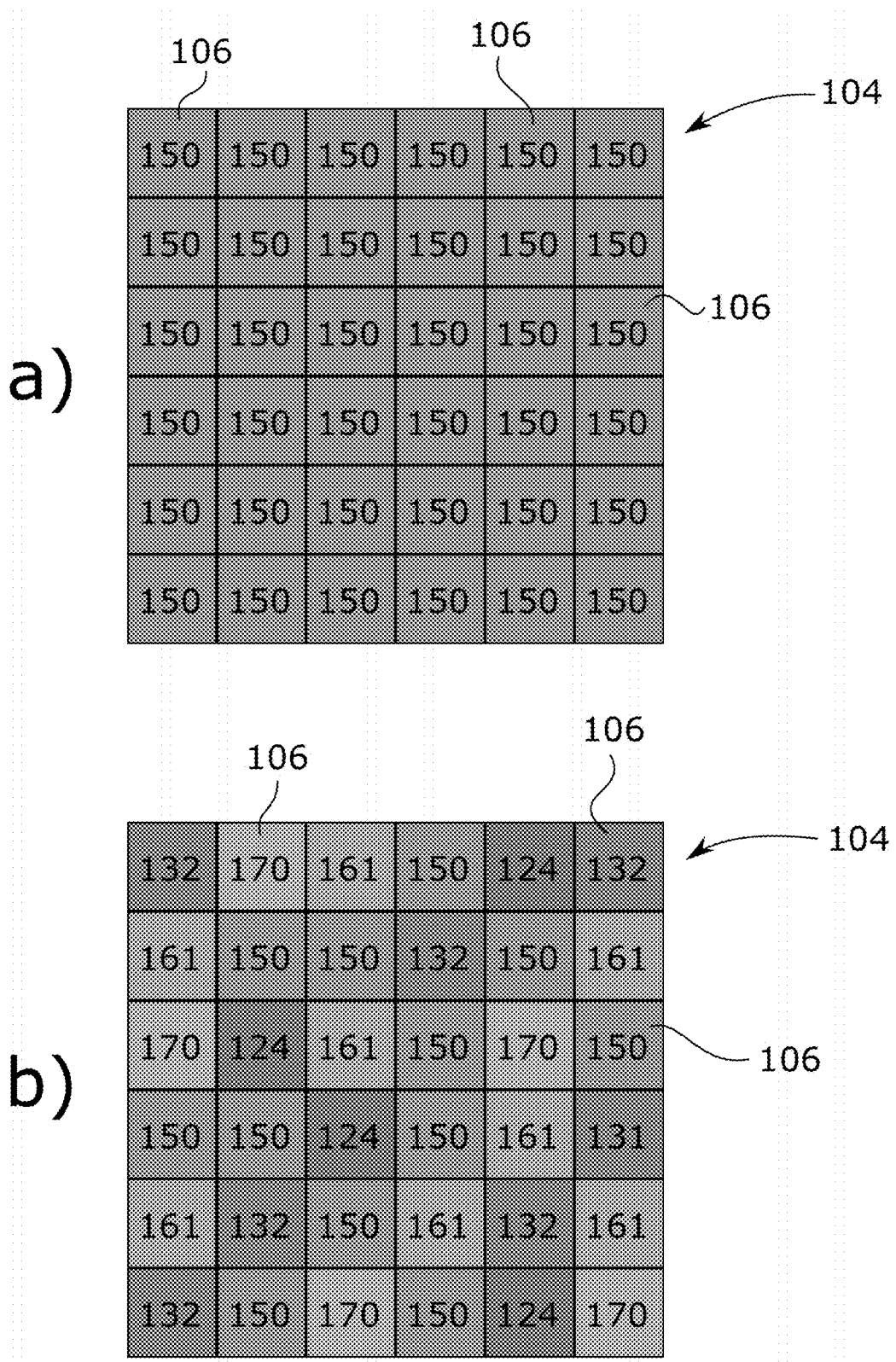
Figure 3:
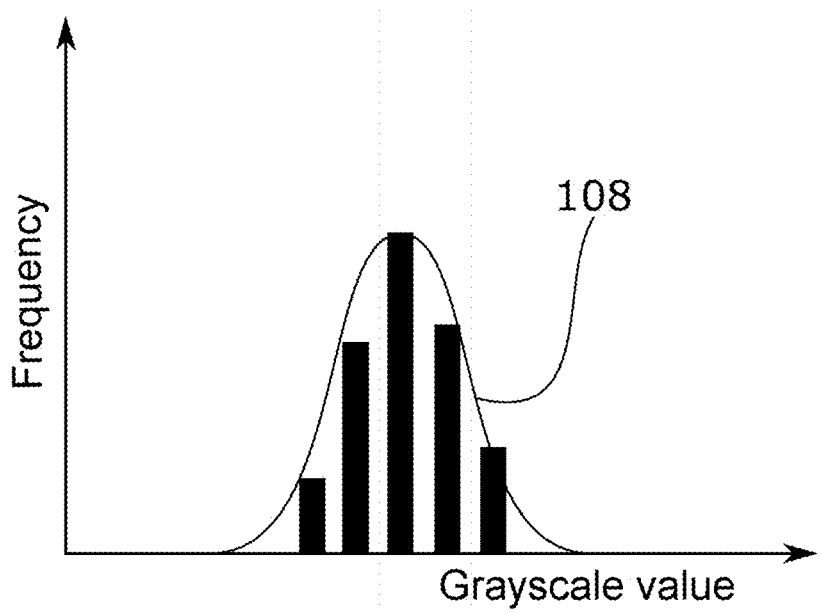
Figure 4:
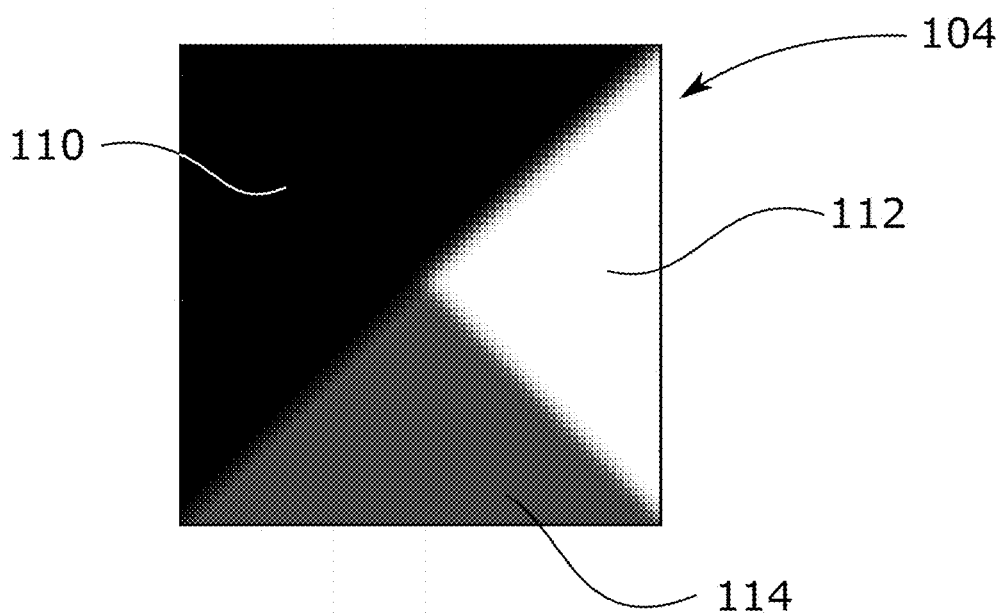
Figure 5:
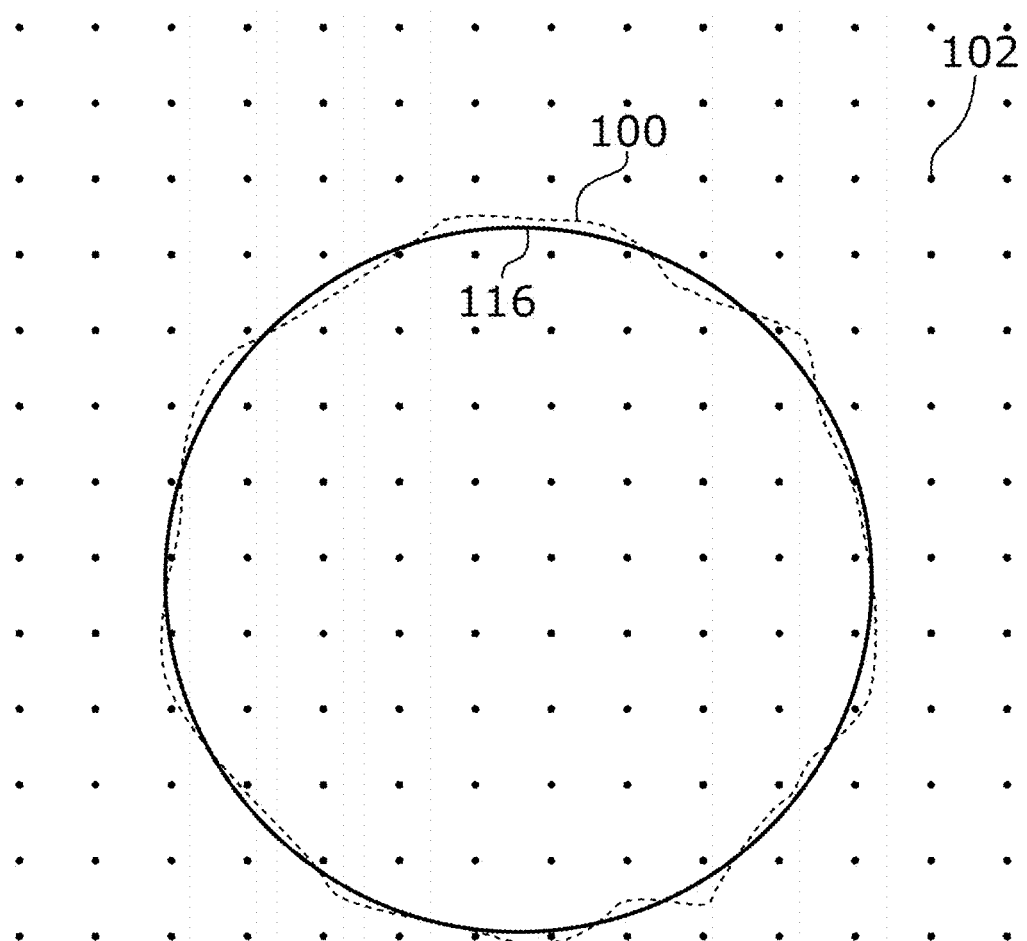
Figure 6:
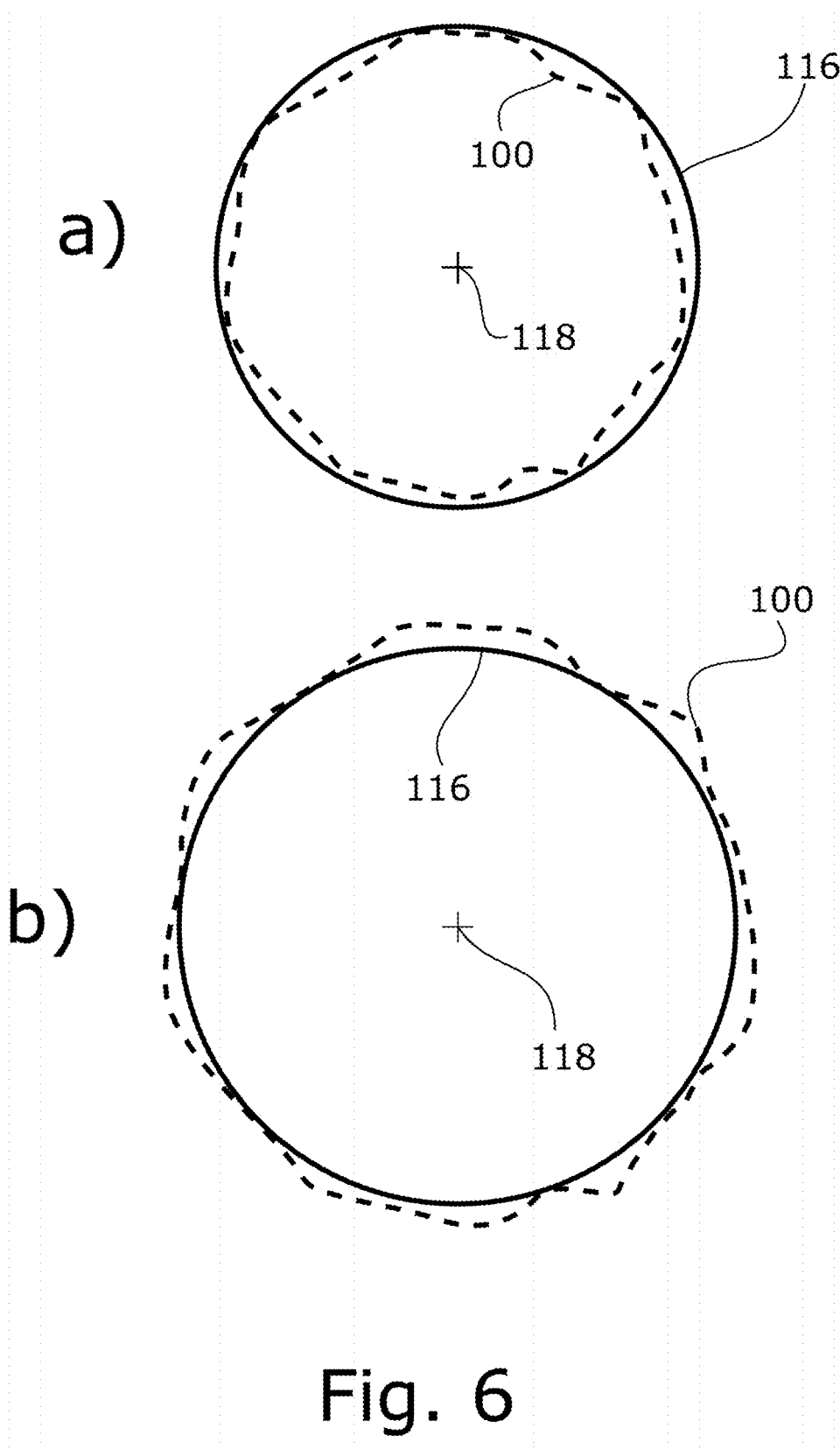
Figure 7:
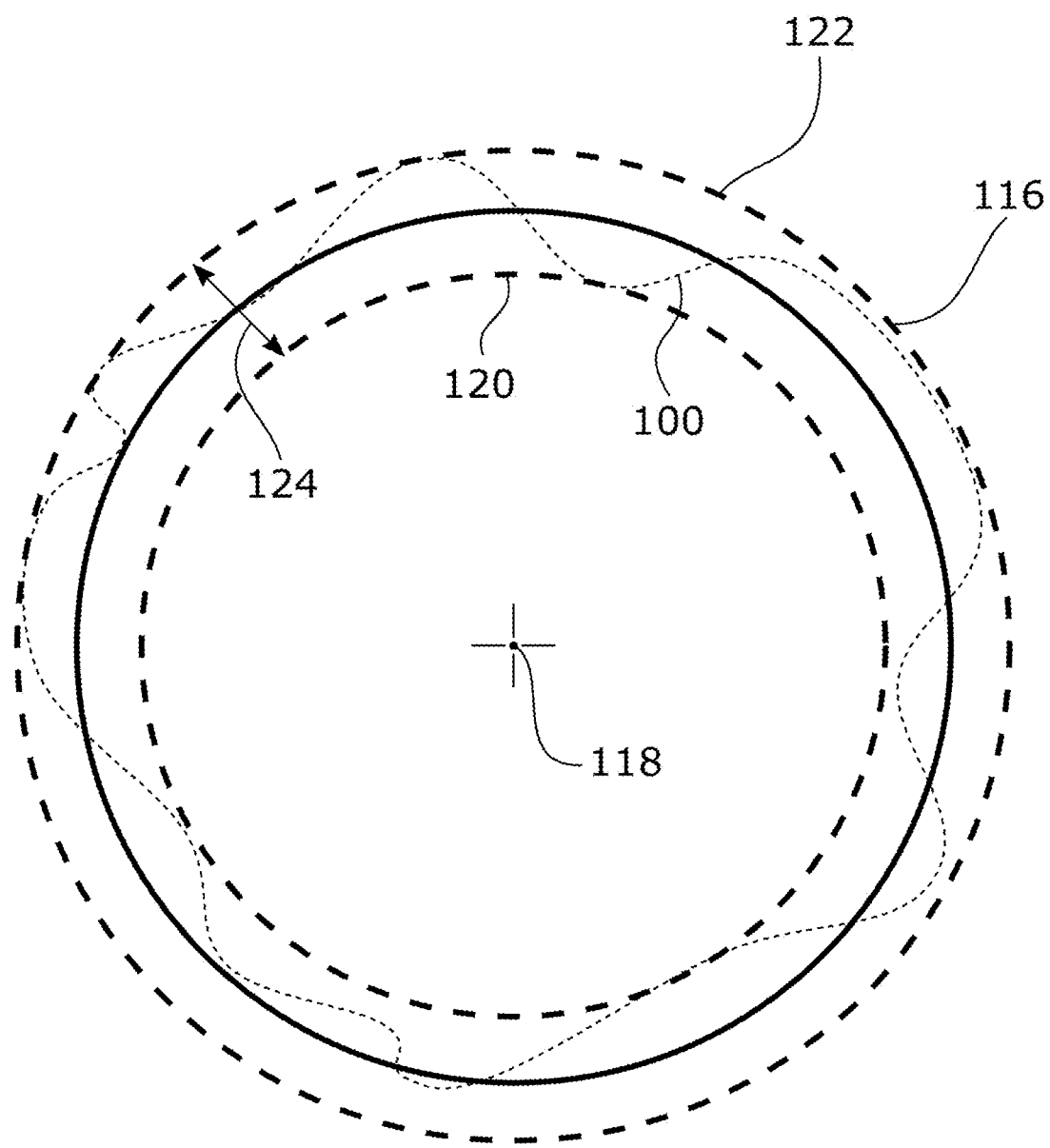
Figure 8:
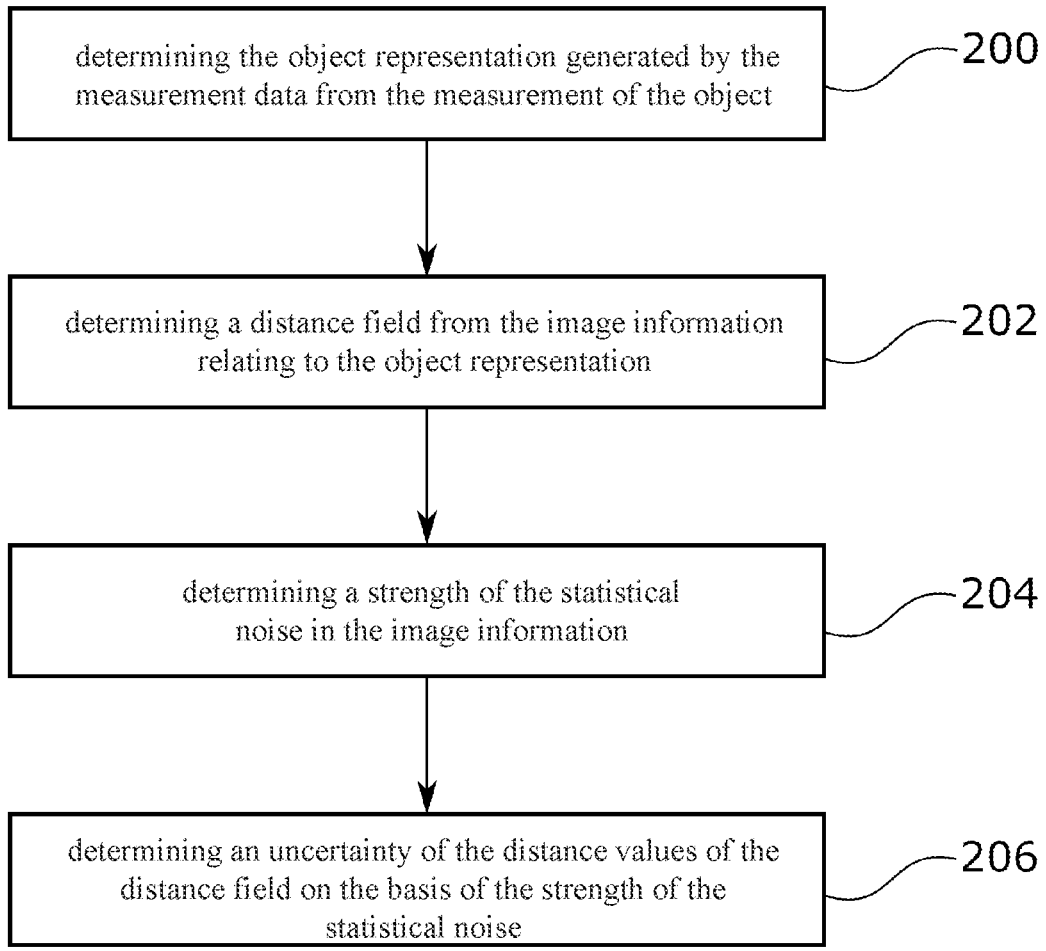

Further features, details and advantages of the invention emerge from the wording of the claims and from the following description of exemplary embodiments on the basis of the drawings, in which:

FIG. 1 shows a schematic illustration of an object representation having a distance field, FIG. 2 shows a schematic illustration of an object representation with and without noise, FIG. 3 shows a schematic illustration of the distribution of grayscale values on account of statistical noise, FIG. 4 shows a schematic illustration of an object representation having a plurality of regions, and FIG. 5 shows a schematic illustration of fitting in a target geometry on the basis of the material boundary surfaces of an object, FIG. 6 shows a schematic illustration of fitting in a target geometry as an inscribed or circumscribing figure, FIG. 7 shows a schematic illustration of fitting in a target geometry on the basis of a minimum zone fit, and FIG. 8 shows a flowchart of a method according to the invention.

Features which are similar or identical to one another are indicated using the same reference symbols below.

FIG. 1 shows a schematic illustration of an object representation, wherein a distance field is superimposed on the object representation. In the illustrated embodiment, the object is substantially represented by its material boundary surface 100 which extends diagonally through the image section. For example, the material boundary surface 100 may be the junction at which a first material of a represented object adjoins the ambient air. The represented object may be, for example, a workpiece which consists of a metal or a plastic.

In the illustrated embodiment, the distance field is represented substantially by data points 102 which are superimposed on the object representation in a regular isotropic raster. In addition to such a rastered representation of a distance field, the distance field may also be present as a continuous scalar field. However, for reasons of representability, the distance field in FIG. 1 is represented as a rastered field. In addition to the orthogonal raster illustrated in FIG. 1, a raster for representing a distance field could have any desired geometry which is suitable for forming a continuous raster. It is also pointed out that the two-dimensional representation selected in FIG. 1 has been selected only for reasons of simpler representability. The described situations can similarly also be applied to three-dimensional representations of an object. For example, FIG. 1 illustrates a two-dimensional raster comprising square cells which can readily be applied to a third dimension in which the raster which be constructed by means of uniform cubes.

The individual data points 102 in the distance field are assigned distance values which describe how large the minimum distance is between a data point 102 and the material boundary surface 100. The minimum distance between a data point 102 and the material boundary surface 100 generally extends perpendicular to the material boundary surface 100. FIG. 1 illustrates, by way of example, the distances for a subset of the data points 102 which are in the immediate environment of the material boundary surface 100.

The representation of a material boundary surface 100, as shown in FIG. 1, can be derived, for example, from a rastered representation of the object which results from a computer tomographic examination of the object. In this case, an object is exposed with x-rays from different directions, wherein the strength of the x-rays passing through the object is recorded by a detector arranged behind the object. A three-dimensional representation of the object can be reconstructed from the sum of the x-ray images generated in this manner from different directions. A three-dimensional raster consisting of regular volume pixels (voxels) is usually used in this case, wherein a grayscale value representative of the determined x-ray density of the object at the position of the voxel is respectively assigned to the individual voxels. Within a solid body, it can theoretically be expected that that grayscale value of the object representation which characterizes the x-ray density has a constant value. A corresponding image section which shows a solid material region without any material transition and without a material boundary surface is illustrated in FIG. 2 *a*).

FIG. 2 *a*) shows a schematic illustration of a section of a representation of an object 104, wherein the section comprises a subregion having a total of 36 measurement points 106. In this case, the individual measurement points 106 are arranged in a regular square grid. An item of information relating to the represented object in the form of a grayscale value is respectively coded in the measurement points 106. As described above, FIG. 2 *a*) may be imaging of an object by means of a computer tomograph, for example. In the illustrated example, the grayscale values of the pixels or measurement points 106 are coded as an 8-bit value. Consequently, the grayscale values can assume numerical values between 0 and 255. In the illustrated example, all measurement points 106 consistently have the grayscale value 150.

A representation, as depicted in FIG. 2 *a*), is present, for example, if a region having a homogeneous material density of an object is imaged, assuming that no imaging errors are produced by the imaging system, that is to say the computer tomograph, for example.

However, it is actually never the case that an inherently homogeneous region of a represented object is also actually homogeneously represented in the object representation 104. Rather, the representation of the object, as illustrated in an idealized manner in FIG. 2 *a*), in reality has different imaging errors, for example statistical noise, superimposed on it. The resulting situation is illustrated in FIG. 2 *b*).

In this case, FIG. 2 *b*) shows exactly the same image section as FIG. 2 *a*), but, in the object representation 104 in FIG. 2 *b*), the image information relating to the measurement points 106 is scattered in a manner statistically distributed around the actually expected value 150 on account of statistical noise. The scattering illustrated in FIG. 2 *b*) is very highly pronounced scattering which ideally should not occur to this extent. However, it is entirely possible for such scattering to occur in measurements with a computer tomograph. In this case, the image information relating to the measurement points 106 differs, by sometimes more than 20 units of the represented measurement variable, in the upward or downward direction from the actual value of the image information of 150, which corresponds to a relative deviation of more than 10% of the actual measured value.

A distribution of the grayscale values, as are illustrated by way of example in FIG. 2 *b*), is schematically illustrated in FIG. 3. In this case, the frequency of a particular grayscale value is plotted against the corresponding grayscale value. Since the noise which causes the deviations of the image information in FIG. 2 b) from the idealized representation in FIG. 2 a) is a statistical process, the grayscale values are generally distributed in a Gaussian manner around an expected value of the grayscale value. In this case, a value of 150 should be assumed as the expected value, for example, in the center of the illustrated Gaussian distribution 108, which corresponds to the actual image information according to FIG. 2 a).

According to one embodiment, a statement on the strength of the statistical noise, as illustrated by way of example in FIG. 2 b), can be made using the parameters of the Gaussian curve 108 which describes the image information in FIG. 2 b). For example, the standard deviation of the Gaussian curve 108 can be used to estimate the strength of the statistical noise. By way of example, it can be assumed, for example for the Gaussian curve in FIG. 3, that the standard deviation is determined as a numerical value of 8. From this information, it is possible to estimate, for example, that the grayscale values of the measurement points 106 in FIG. 2 b) will lie in a range of 150±8.

It should be noted at this point that the selected numerical values for grayscale values and standard deviations have been selected only for exemplary reasons. During a measurement which is actually taking place, noise resulting from the measurement and the processing of the measurement results may be entirely stronger or weaker than in the case described by way of example. The gradation of the grayscale values to a coding using 8 bits, that is to say numerical values between 0 and 255, has likewise also been selected only for exemplary reasons. It is entirely possible for coding using 16 bits or 32 bits or more to also be provided for a finer resolution, with the result that numerical values between 0 and 65,535 or more are available for the gradation of the image information.

The knowledge that the grayscale values of the object representation 104 in FIG. 2 b) are afflicted with an error of ±24 units of the represented measurement variable can be used to determine how this error is reflected in the determination of the position of material boundary surfaces 100 and ultimately in the distance values of the distance field. For this purpose, it is possible to determine, for example, a computing rule, on the basis of which an uncertainty of the distance values can be determined from the image information relating to an object representation by determining the error propagation. For example, the error in a distance value can be estimated from the quotient of the determined strength of the statistical noise and the gradient of the image information in the region of the image information considered.

An object representation, which is recorded using a computer tomograph for example, usually differs from the idealized representation in FIG. 2 since different material qualities are generally imaged in different regions. In this respect, for example, FIG. 4 shows, by way of example, an object representation 104 in which different items of image information are respectively imaged in three regions of the object representation. For example, the first region 110 which is illustrated at the top left and is substantially black may be ambient air, whereas the brighter regions 112 and 114 on the right and at the bottom in the illustrated image section may be a metal or a plastic, for example.

The above-described statistical noise is reflected here to different extents in the different regions on account of the different image information. For example, it can be observed that the noise is stronger in the second region 112, which is substantially white, than in the black region 110. Consequently, a global determination of a strength of the noise and a corresponding estimation of the uncertainty of the distance values of the material boundary surfaces of all points in the illustrated object representation 104 on the basis of this strength, which distance values are derived from the grayscale values, would not satisfy with the conditions in the individual regions 110, 112 and 114. Therefore, one embodiment provides for the object representation 104 to first of all be subdivided into regions, wherein the top left region 110, the right-hand white region 112 and the lower gray region 114 could be selected, for example, in the present case. As described above, the strength of the statistical noise in the image information would then be respectively determined for each of these regions 110, 112 and 114 and the uncertainty of the measurement data or accordingly derived distance values would be estimated.

As can also be seen in FIG. 4, in addition to the homogeneous regions 110, 112 and 114, regions in which the image information slowly changes from a first value to a second value also usually exist in an object representation 104. The strength of the statistical noise can be estimated in such regions, for example, by carrying out interpolation between the accordingly determined values in the regions, for example 110 and 112.

FIG. 5 shows a schematic illustration of an object represented by the material boundary surface 100 in a distance field having a multiplicity of data points 102. The illustrated object may be, for example, a drilled hole in a body, with the result that the material of the illustrated body, for example metal, exists outside the region circumscribed by the material boundary surface 100, whereas air is imaged inside the region circumscribed by the material boundary surface 100.

The course of the material boundary surface 100 is depicted in an extremely uneven manner in FIG. 5. However, such a course of a material boundary surface in a drilled hole generally cannot be observed when examining a workpiece which is actually intended to have a circular drilled hole. The choice of highly exaggerated deviations of the depicted geometry from a target geometry is used only to better illustrate the situation in the present case. In this case, as explained with respect to FIG. 1, the course of the material boundary surface 100 is coded by distance values which are assigned to the individual data points 102.

In the image section in FIG. 5, a target geometry 108 has been fitted into the geometry of a represented object, which geometry is represented by the distance field. In the variant illustrated in FIG. 2, the target geometry 116 can be fitted in by means of the least squares method, for example. In this case, the target geometry 116 is fitted into the material boundary surface 100 coded by the distance values of the data points 102 in such a manner that the mean square distance between the target geometry 116 and the material boundary surface 100 is minimal. Information relating, for example, to the position of the target geometry 116 or of the drilled hole represented by the target geometry 116 in FIG. 5 and relating to the diameter of the drilled hole can then be derived from the target geometry 116 which has been fitted in.

The target geometry 116 selected in FIG. 5, namely a circular geometry, is used only as an example. Similar representations would also be possible for target geometries such as corners, edges, cuboids or similar geometries.

As a result of the direct fit of the target geometry 116 to the material boundary surface 100 represented by the distance field by means of the distance values of the data points 102, a target geometry 116 can be accordingly accurately fitted in assuming that the material boundary surface 100 represented by the distance field has been determined with the maximum accuracy given by the measurement data. This quickly becomes evident in the least squares method, for example.

In the least squares method, also known as a Gaussian fit, an attempt is made to position a function relative to a set of measurement points in such a manner that the square distance of the measurement points from the function is minimal. For this purpose, the set of measurement points, the position of the material boundary surface 100 in the present case, must first of all be determined. The respective distance between the points and the target geometry 116 to be fitted in must then be determined for the set of points determined in this manner on the material boundary surface 100. The position of the target geometry 116 can then be varied in such a manner that the mean square distance between the points on the material boundary surface 100 and the corresponding points on the target geometry 116 is minimized.

However, the above-described intermediate step of determining points on a material boundary surface 100 can be dispensed with if the material boundary surfaces 100 are coded by a distance field. This is because, in this case, the subsequent determination of the distances between points on the surface of the target geometry 116 and the corresponding points on the material boundary surface 100 can be implemented by determining the respective distance values of the data points 102 and the respective distances between the data points 102 and the target geometry 116 for data points 102 in the vicinity of the target geometry 116. The distance between the target geometry 116 and the material boundary surface 100 in the vicinity of the data points 102 can then be respectively determined from the respective difference between the distances of the data points 102 from the target geometry 116 which are determined in this manner and the distance values which have been read out. The target geometry 116 can then be fitted in by positioning the target geometry 116 in such a manner that the distances determined in the manner described above between the target geometry 116 and the material boundary surface 100 are minimized. The determination of points on the material boundary surface 100 and inaccuracies associated therewith are dispensed with in this case.

In addition to the above-described fit of a target geometry 116 on the basis of the least squares method, it can also be useful in different situations to use other methods to fit the target geometry 116 into the material boundary surface 100 coded by the distance values. In this respect, FIG. 6 illustrates two possible fitting methods, namely fitting in a target geometry 116 as a circumscribing figure in FIG. 6 a) and fitting in the target geometry 116 as an inscribed figure in FIG. 6 b). A circular shape was again also selected as the target geometry 116 in FIG. 6 in order to illustrate the situation.

In FIG. 6 a), the target geometry 116 is fitted to the material boundary surface 100 as a circumscribing figure. For reasons of clarity, the distance field illustrated in FIG. 5 and the data points 102 of the distance field are not illustrated in FIG. 6. As can be seen in FIG. 6 a), a circumscribing figure is a figure which is arranged in such a manner that all points of the material boundary surface 100 are arranged inside the target geometry 116 which has been fitted in. It may be useful to fit in a target geometry 116 as a circumscribing figure, for example, when the geometry, which is illustrated in FIG. 6 a), is a pin projecting from an object, for example. This is because the maximum diameter of the pins is relevant in this case, such that it is possible to decide whether or not the pin fits in a corresponding drilled hole.

In contrast, FIG. 6 b) shows fitting of a target geometry 116 into a material boundary surface 100, in which the target geometry 116 is fitted into the material boundary surface 100 as an inscribed figure. This means that the target geometry 116 is arranged completely inside the material boundary surface 100. This form of fitting may be relevant, for example, for analyzing bores or holes in an examined object. This is because the minimum diameter of a drilled hole is relevant in this case in order to decide whether the drilled hole is suitable for accommodating a corresponding counterpart element. In the comparison of FIGS. 6 a) and 6 b), it should be noted that, as a result of the choice of an inscribed or circumscribing figure, not only the diameter of the examined geometry, as determined from the target geometry 116 which has been fitted in, leads to different results, but also the center point 118 of the target geometry 116 which has been fitted in can be different.

In addition to the above-described variants of fitting in a target geometry 116 by means of a mean square deviation or the fitting in of a target geometry 116 as an inscribed or circumscribing figure, a target geometry 116 can furthermore also be fitted in as part of a minimum zone fit, as illustrated in FIG. 7.

In this respect, FIG. 7 illustrates a material boundary surface 100 which has a geometry which differs to a significantly greater extent from a circular shape than the material boundary surfaces 100 illustrated in FIGS. 5 and 6. This geometry was again selected only for better illustration.

In a minimum zone fit, the target geometry 116 is generally fitted into the material boundary surface 100 both as an inscribed figure and as a circumscribing figure. The corresponding inscribed figure is indicated using the reference sign 120, whereas the circumscribing figure has the reference sign 122. The position of the target geometry 116 is then determined from the inscribed FIG. 120 and the circumscribing FIG. 122 by positioning the target geometry 116 precisely in such a manner that it is at the same distance 124 from the circumscribing FIG. 122 and the inscribed FIG. 120 in each case. In this case, the inscribed FIG. 120 and the circumscribing FIG. 122 are positioned in such a manner that their center point 118 is identical.

FIG. 8 shows a flowchart of the method according to the invention. In this case, the measurement data relating to the object representation are first of all determined in a first method step 200. For this purpose, both a measurement can be carried out on the object to be represented and an existing object representation can be read from a storage medium, for example. The measurement can be carried out, for example, with the aid of a computer tomograph, which enables a non-destructive examination of the object to be represented. A distance field having a multiplicity of distance values describing the material boundary surfaces 100 of the represented object is then determined in step 202 from the measurement data or image information relating to the object representation which is/are determined in step 200. In this case, a distance value describes, for a particular point in the distance field, how far away precisely this point is from the closest material boundary surface of the represented object in the object representation.

In this case, the distance field may be present in rastered form, in which at least one distance value is respectively assigned to each raster point, or can be stored in the form of a scalar distance field, with the result that a distance value is assigned to any desired point within the object representation by means of the scalar distance field.

After determining the distance field from the image information, the strength of statistical noise which is superimposed on the image information relating to the determined object representation is then determined in step 204. In this case, such statistical noise may have different causes which are usually due to the imaging apparatus used to generate the object representation or to determine the measurement data. The strength of the statistical noise can be determined, for example, by creating statistics of the image information, wherein the standard deviation of the image information can then be interpreted as noise from the statistics of the image information. However, other approaches which can be used to estimate the strength of the statistical noise are also possible.

On the basis of the previously determined strength of the statistical noise, a method step 206 then determines how great the uncertainty of the previously determined distance values of the distance field is. For this purpose, it is possible to derive, for example, a computing rule, on the basis of which the position of a material boundary surface or the associated distance value of the distance field can be determined from the image information relating to the object representation. The uncertainty of a distance value can then be derived by determining the associated error propagation of the computing rule by assuming the strength of the statistical noise to be an error in the respective image information. For example, the uncertainty of a distance value can be derived from the quotient of the strength of the statistical noise and the gradient of the image information in the region of the distance value.

The invention is not restricted to one of the embodiments described above, but rather can be modified in various ways.

All features and advantages which emerge from the claims, the description and the drawing, including design details, spatial arrangements and method steps, can be essential to the invention both alone and in a wide variety of combinations.

LIST OF REFERENCE SIGNS

- 100 Material boundary surface
- 102 Data point
- 104 Object representation
- 106 Image point/measurement point
- 108 Gaussian curve
- 110 First region
- 112 Second region
- 114 Third region
- 116 Target geometry
- 118 Center point
- 120 Inscribed FIG.
- 122 Circumscribing FIG.
- 124 Distance It is claimed:

1. A computer-implemented method for determining uncertainties in measurement data from a measurement of an object, wherein a digital object representation of the object is generated by the measurement, wherein the object representation has a multiplicity of items of image information, wherein an item of image information indicates a value of a measurement variable for the object at a defined position of the object, wherein statistical noise exists due to errors in the measurement of the object, wherein the statistical noise is superimposed on the image information of a measurement of the object without the errors, wherein the method has the following steps:

determining the object representation generated by the measurement data from the measurement of the object,
   determining a distance field from the image information relating to the object representation, wherein the distance field has a multiplicity of distance values, wherein a distance value for a particular point in the distance field indicates the shortest distance between the point and a closest material boundary surface of the object,
   determining a strength of the statistical noise in the image information,
   determining an uncertainty of the distance values of the distance field on the basis of the strength of the statistical noise, and
   determining an uncertainty of the position of at least one point on at least one material boundary surface from the uncertainty of the distance values of the distance field.

2. The method as claimed in claim 1, characterized in that the determination of an uncertainty of a distance value has the following steps:

determining an error in the image information relating to a defined point of the object from the strength of the statistical noise,
   determining a computing rule for determining the distance values from the image information relating to the object representation, and
   determining the uncertainty of the distance value from the effect of the error on the result of the computing rule.

3. The method as claimed in claim 2, characterized in that the uncertainty of a distance value is determined from the quotient of the strength of the statistical noise in the image information on which distance value is based and the gradient of the image information in the region of the distance value.

4. The method as claimed in claim 1, characterized in that the method also comprises subdividing the image information into spatial regions of the object, wherein the strength of the statistical noise is respectively determined separately for the different spatial regions of the image information.

5. The method as claimed in claim 4, characterized in that the strength of the statistical noise for a region is determined from the image information relating to a subset of the measurement points of the region.

6. The method as claimed in claim 4, characterized in that the determination of the strength of the statistical noise in the image information for one of the regions has the following steps:

determining an average value of the image information relating to the region,
   determining the mean deviation of the image information relating to the region from the average value, and
   defining the mean deviation as strength of the statistical noise in the image information.

7. The method as claimed in claim 1, characterized in that the strength of the statistical noise is the standard deviation of the statistical noise.

8. The method as claimed in claim 1, characterized in that the strength of the statistical noise for a point in the object representation is determined from the image information within a defined environment around the point.

9. The method as claimed in claim 1, characterized in that the method also comprises determining at least one dimension of the object from the distance values of the distance field and determining an uncertainty of the dimension on the basis of the uncertainty of the distance values.

10. The method as claimed in claim 9, characterized in that the determination of a dimension of the object from the distance values of the distance field comprises determining and fitting a target geometry of the object into the distance field by using a fit method and determining the dimensions of the object on the basis of the target geometry which has been fitted in.

11. The method as claimed in claim 10, characterized in that the least squares method and/or a minimum zone fit is used to fit in the determined target geometry, and/or in that the determined target geometry is fitted into the distance field as an inscribed or circumscribing figure.

12. The method as claimed in claim 10, characterized in that the target geometry of the object is specified by a user input and/or is determined from a CAD file and/or is determined from the distance field.

13. The method as claimed in claim 1, characterized in that the determination of the distance field comprises the following steps:
  determining the position of material boundary surfaces from the image information relating to the object representation,
  determining a material boundary surface which is closest to a data point in each case for the data points of the distance field,
  determining the respective distance between the data points and the respective closest material boundary surface, and
  assigning the respectively determined distance to the respective data points as a distance value.

14. The method as claimed in claim 1, characterized in that the object representation is a rastered representation of the object, wherein the rastered representation has a multiplicity of measurement points of a measurement of the object which are arranged in a raster, wherein a measurement point has at least one item of image information.

15. The method as claimed in claim 1, characterized in that the measurement is a computer tomographic measurement, wherein the image information describes the local x-ray absorption of the object at the location of the measurement point.

16. A non-transitory computer program product having instructions which can be executed on a computer and, when executed on a computer, cause the computer to carry out the method as claimed in claim 1.

* * * * *